United States Patent
Lim

(10) Patent No.: US 11,688,913 B2
(45) Date of Patent: Jun. 27, 2023

(54) BATTERY CONTACT MEMBER AND HIGH VOLTAGE BATTERY ASSEMBLY INCLUDING THE SAME

(71) Applicant: HYUNDAI MOBIS Co., Ltd., Seoul (KR)

(72) Inventor: Tae Hoon Lim, Yongin-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 304 days.

(21) Appl. No.: 17/137,183

(22) Filed: Dec. 29, 2020

(65) Prior Publication Data

US 2022/0190432 A1    Jun. 16, 2022

(30) Foreign Application Priority Data

Dec. 11, 2020 (KR) .................. 10-2020-0173713

(51) Int. Cl.
| | |
|---|---|
| *H01M 50/291* | (2021.01) |
| *H01M 10/613* | (2014.01) |
| *H01M 10/625* | (2014.01) |
| *H01M 10/655* | (2014.01) |
| *H01M 10/658* | (2014.01) |
| *H01M 50/249* | (2021.01) |
| *H01M 50/244* | (2021.01) |

(52) U.S. Cl.
CPC ....... *H01M 50/291* (2021.01); *H01M 10/613* (2015.04); *H01M 10/625* (2015.04); *H01M 10/655* (2015.04); *H01M 10/658* (2015.04); *H01M 50/244* (2021.01); *H01M 50/249* (2021.01); *H01M 2220/20* (2013.01)

(58) Field of Classification Search
CPC ............. H01M 10/613; H01M 10/625; H01M 10/655; H01M 10/658; H01M 50/291; H01M 50/249; H01M 50/244
See application file for complete search history.

(56) References Cited

U.S. PATENT DOCUMENTS

| | | | |
|---|---|---|---|
| 10,516,192 B2 | 12/2019 | Prevost et al. | |
| 10,520,264 B2 | 12/2019 | Morton et al. | |
| 2020/0028202 A1 | 1/2020 | Miyoshi et al. | |

FOREIGN PATENT DOCUMENTS

| | | | | |
|---|---|---|---|---|
| JP | 2018-095096 A | 6/2018 | | |
| KR | 20130057530 A | 6/2013 | | |
| KR | 20140078558 A | * | 6/2014 | .......... H01M 10/625 |

(Continued)

OTHER PUBLICATIONS

Office Action dated Nov. 1, 2022 issued in KR Patent Application No. 2013-0057530.

*Primary Examiner* — Karie O'Neill Apicella
(74) *Attorney, Agent, or Firm* — Morgan, Lewis & Bockius LLP

(57) ABSTRACT

The present invention relates to a battery contact member allowing a high voltage battery and a cooling device to be in uniform contact with each other and a high voltage battery assembly including the same, and includes a high voltage battery, a battery housing in which the high voltage battery is accommodated, a plurality of battery contact members disposed between the high voltage battery and the battery housing, and a plurality of cooling blocks which are each inserted into one of the plurality of battery contact members to be in contact with the high voltage battery and cool the high voltage battery.

17 Claims, 10 Drawing Sheets

(56) References Cited

FOREIGN PATENT DOCUMENTS

| | | | |
|---|---|---|---|
| KR | 10-1563405 | B1 | 10/2015 |
| KR | 10-1721256 | B1 | 3/2017 |
| KR | 10-1796106 | B1 | 11/2017 |
| KR | 10-1844818 | B1 | 5/2018 |
| KR | 10-2066198 | B1 | 1/2020 |

\* cited by examiner

BATTERY CONTACT MEMBER AND HIGH VOLTAGE BATTERY ASSEMBLY INCLUDING THE SAME

CROSS-REFERENCE TO RELATED APPLICATION

This application claims priority to and the benefit of Korean Patent Application No. 10-2020-0173713, filed on Dec. 11, 2020, the disclosure of which is incorporated herein by reference in its entirety.

BACKGROUND

1. Field of the Invention

The present invention relates to a high voltage battery assembly, and more specifically, to a battery contact member allowing a high voltage battery to be in uniform contact with a cooling device and a high voltage battery assembly including the same.

2. Discussion of Related Art

Recently, with the increased interest in environmental protection, from the development of vehicles using the conventional combustion type engines, the development of other type vehicles in consideration of eco-friendliness and fuel economy, that is, hybrid vehicles and electric vehicles, is actively progressing.

Since the hybrid vehicle is driven by two power sources including the conventional engine and the motor operated in conjunction with the engine and driven by electric energy, the hybrid vehicles are positioned as realistic next-generation vehicles which are recently in the spotlight in America, Japan, and Europe due to effects of reducing environmental pollution caused by exhaust gas and improving fuel economy.

Generally, in the hybrid vehicle, an engine which is driven by gasoline or diesel is used as a main power source, and a motor is used as an auxiliary power source. Then, the vehicle travels using the engine as a power source at a predetermined speed or more, and during low speed travel, the power source is switched to the motor, and the vehicle travels.

In addition, in the electric vehicle, a motor is mainly used as a main power source.

A high voltage battery is used as the power source needed to drive the motor, and since the high voltage battery is a main factor of a lifetime of not only the electric vehicle but also the hybrid vehicle, the high voltage battery should be thoroughly managed so as to be effectively used.

In a case in which the high voltage battery is used for a lone time, heat is generated by the battery, and in the case of a high capacity battery, since an amount of a current increases, more heat is generated thereby.

In this case, when the generated heat is not sufficiently cooled, the performance of the battery may be degraded, or the battery may also be ignited or exploded.

Accordingly, in order to maintain and improve the performance of the battery, the battery is necessarily cooled, and a battery cooling device is used in any eco-friendly vehicle in order to guarantee the lifetime and performance of the battery included in the eco-friendly vehicle.

In addition, a plurality of contact devices have been generally developed that are disposed to be spaced apart from each other by a distance along a circumference of the high voltage battery to allow the cooling device to be in uniform contact with the high voltage battery.

The conventional contact device includes an insulating member formed of a plastic material to electrically insulate the high voltage battery from a housing accommodating the high voltage battery and an elastic member pressing the cooling device so that the cooling device is in contact with the high voltage battery.

The battery cooling device should be in uniform contact with the high voltage battery, but in some cases, the battery cooling device is not in uniform contact with the high voltage battery due to physical forces such as vibration and the like generated when the vehicle travels.

In this case, the high voltage battery has a problem of a decrease in cooling efficiency due to an increase in local temperature.

SUMMARY OF THE INVENTION

The present invention is directed to providing a battery contact member allowing a high voltage battery to be in uniform contact with a cooling device and a high voltage battery assembly including the same.

The above-described objectives, the other objectives, advantages, and features of the present invention, and achieving methods thereof will be clearly understood with reference to the accompanying drawings and following detailed embodiments.

To solve the problems, a high voltage battery assembly according to one embodiment of the present invention includes a high voltage battery, a battery housing in which the high voltage battery is accommodated, a plurality of battery contact members disposed between the high voltage battery and the battery housing, and a plurality of cooling blocks which are each inserted into one of the plurality of battery contact members to be in contact with the high voltage battery and cool the high voltage battery.

The plurality of battery contact members may be disposed to be spaced apart from each other by a distance along a circumference of the high voltage battery.

The battery contact member according to one embodiment of the present invention includes an insulating member which is vertically inserted into a battery housing and of which one surface is coupled to a cooling block in a fitting manner, a coupling member pressed against the other surface of the insulating member, and a plurality of elastic members of which one surfaces are coupled to the other surface of the insulating member with the coupling member serving as a medium, and the other ends are in contact with an inner side surface of the battery housing to elastically press the insulating member.

The insulating member may include a first base portion forming a body of the insulating member, and extending portions extending from both end portions of the first base portion in a direction in which the cooling block is disposed.

The extending portions formed in a pair may be spaced apart from each other by a width of the cooling block.

The insulating member may further include a plurality of ribs which are spaced apart from each other by a distance on one surface of the first base portion in a width direction and extend in a longitudinal direction, wherein a slot in which an air layer is formed to insulate heat generated by the high voltage battery may be formed between the plurality of the ribs.

The insulating member may further include a pair of coupling protrusions formed on both end portions, which are disposed in a longitudinal direction, of the other surface of the first base portion to be coupled to the coupling member.

The coupling protrusion may be coupled to the coupling member in a hook-coupling manner.

The extending portion may include a guide protrusion in contact with one surface of the cooling block to prevent the cooling block from being separated from the first base portion.

The coupling member may include a second base portion of which one surface is in contact with the other surface of the first base portion, a pair of support portions formed on both end portions, which are disposed in a longitudinal direction, of the other surface of the second base portion to support the elastic member, and a fixing pin disposed between the pair of the support portions on the second base portion to restrict movement of the elastic member.

The coupling member may further include a coupling groove which is formed in the second base portion at a position corresponding to the coupling protrusion, and into which the coupling protrusion is inserted, wherein the coupling protrusion may be coupled to the coupling groove in a hook-coupling manner.

A cross section of the other surface of the second base portion may be formed as a curved surface.

The support portions may include boss members protruding from the other surface of the second base portion, and fixing panels coupled to the boss members and extending from both end portions, which are disposed in the longitudinal direction, of the second base portion in facing directions, wherein the fixing panel may be spaced apart from the second base portion by a distance.

The elastic member may be inserted between the second base portion and the fixing panel.

The elastic member may include a contact portion of which one surface is in contact with the other surface of the second base portion and which is inserted between the support portions, first curved surface portions formed on both ends, which are disposed in a width direction, of the contact portion and forming curved lines extending in an outward direction, second curved surface portions extending from the first curved surface portions and forming curved lines extending in an inward direction, and leg portions obliquely extending outward from the second curved surface portions.

A battery contact member according to another embodiment of the present invention includes an insulating member which is vertically inserted into a battery housing and of which one surface is coupled to a cooling block in a fitting manner, a coupling member pressed against the other surface of the insulating member, and a plurality of elastic members of which one surfaces are coupled to the other surface of the insulating member with the coupling member serving as a medium, and the other ends are in contact with an inner side surface of the battery housing to elastically press the insulating member, wherein the coupling member includes a second base portion forming a body of the coupling member, and a plurality of ribs which are spaced apart from each other by a distance on one surface of the second base portion and extend in a longitudinal direction.

The rib may be in contact with the other surface of the insulating member.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods of achieving the same will be clearly understood with reference to the accompanying drawings and the following detailed embodiments. However, the present invention is not limited to the embodiments to be disclosed but may be implemented in various different forms. The embodiments are provided in order to fully explain the present invention and fully explain the scope of the present invention for those skilled in the art. The scope of the present invention is defined by the appended claims. Meanwhile, the terms used herein are provided only to describe the embodiments of the present invention and not for purposes of limitation. In the present specification, unless the context clearly indicates otherwise, the singular forms include the plural forms. It will be understood that the term "comprise" or "comprising," when used herein, specifies some stated components, steps, operations and/or elements but does not preclude the presence or addition of one or more other components, steps, operations and/or elements.

Hereinafter, one example of a high voltage battery assembly according to one embodiment of the present invention will be described in detail with reference to the accompanying drawings.

Figure 1:
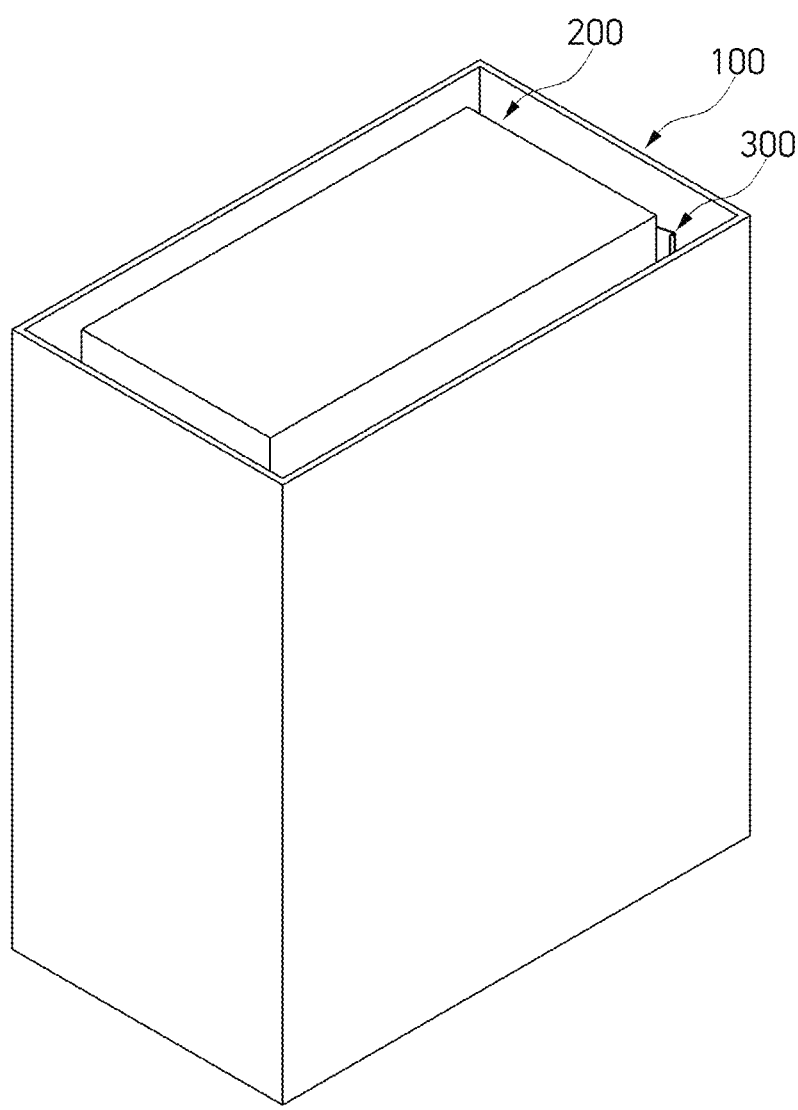
FIG. 1 is a perspective view illustrating a high voltage battery assembly according to one embodiment of the present invention.
Figure 2:
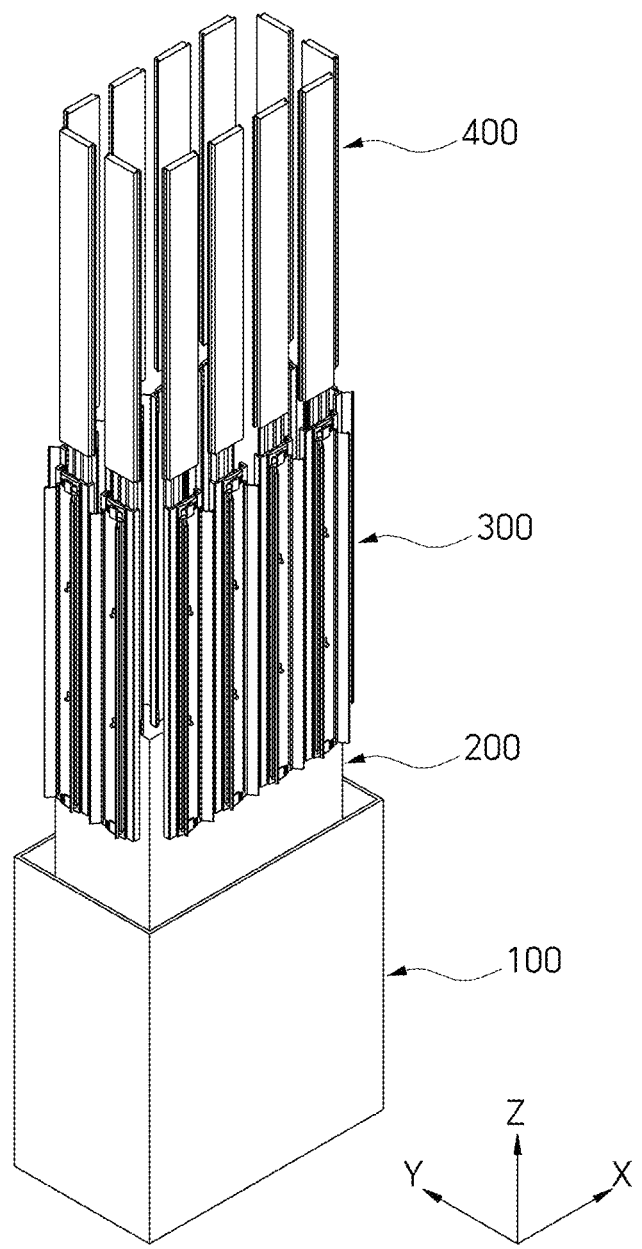
FIG. 2 is a plan view illustrating the high voltage battery assembly according to one embodiment of the present invention when viewed from above.
Figure 3:
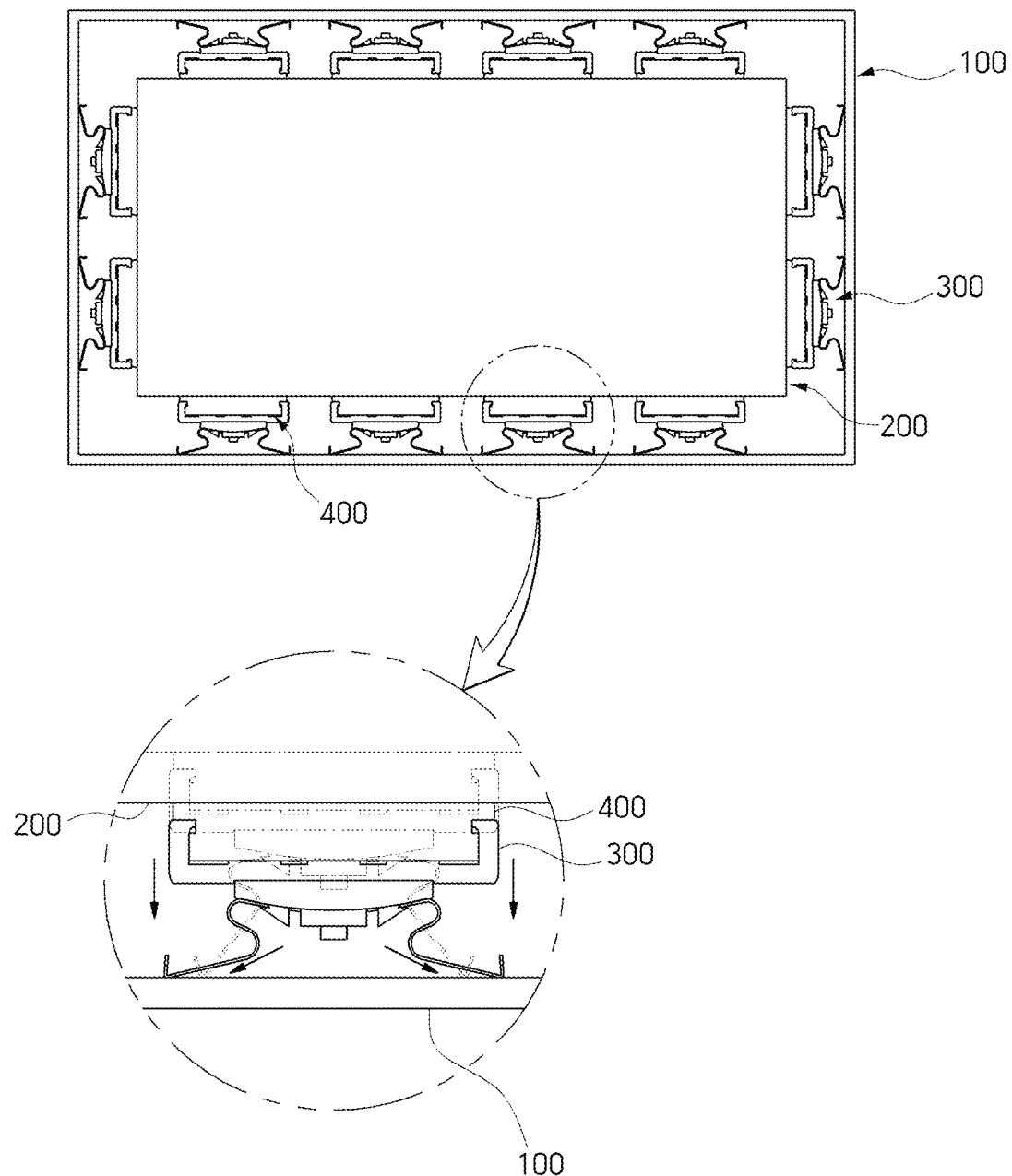
FIG. 3 is an exploded perspective view illustrating a state in which the high voltage battery assembly according to one embodiment of the present invention is exploded.

FIG. 1 is a perspective view illustrating the high voltage battery assembly according to one embodiment of the present invention, FIG. 2 is a plan view illustrating the high voltage battery assembly according to one embodiment of the present invention when viewed from above, and FIG. 3 is an exploded perspective view illustrating a state in which the high voltage battery assembly according to one embodiment of the present invention is exploded.

Referring to FIGS. 1 to 3, an assembly of a high voltage battery 200 according to one embodiment of the present invention includes the high voltage battery 200, a battery housing 100, a battery contact member 300, and a cooling block 400.

The high voltage battery 200 includes a plurality of battery cells and a cover member accommodating the battery cells.

The high voltage battery 200 stores power to be supplied to a system of the high voltage battery 200.

In addition, as illustrated in FIG. 2, an area of the high voltage battery 200 is less than an area of the battery housing 100 when viewed from above.

That is, a circumferential surface of the high voltage battery 200 is spaced apart from an inner circumferential surface of the battery housing 100 by a distance.

As illustrated in FIG. 3, the battery housing 100 is a housing in which an accommodation space is formed, and the voltage battery 200, the battery contact member 300, and the cooling block 400 are accommodated therein.

In addition, an accommodation portion of the battery housing 100 is formed in a shape corresponding to the high voltage battery 200.

Although a plurality of high voltage batteries 200 may be accommodated in the battery housing 100, one high voltage battery 200 may also be accommodated therein.

Hereinafter, a case in which one battery housing 100 is accommodated will be described for the sake of convenience in the description.

The battery contact member 300 is a member inserted between the high voltage battery 200 and the battery housing 100 and inserted in a Z-direction illustrated in FIG. 2.

A plurality of battery contact members 300 are provided and disposed along a circumference of the high voltage battery 200 to be spaced apart from each other by a distance.

In addition, the battery contact member 300 is coupled to the cooling block 400 and elastically presses the cooling block 400 so that the cooling block 400 is in firm contact with an outer circumferential surface of the high voltage battery 200.

The number of a plurality of cooling blocks 400 corresponds to the battery contact members 300, and the plurality of cooling blocks 400 are inserted into a plurality of insulating members 310 of the battery contact members 300.

In addition, the cooling block 400 is in contract with the outer circumferential surface of the high voltage battery 200 due to an elastic force of the elastic member 330 to effectively cool the high voltage battery 200.

Hereinafter, one example of the battery contact member according to one embodiment of the present invention will be described with reference to the accompanying drawings.

Figure 4:
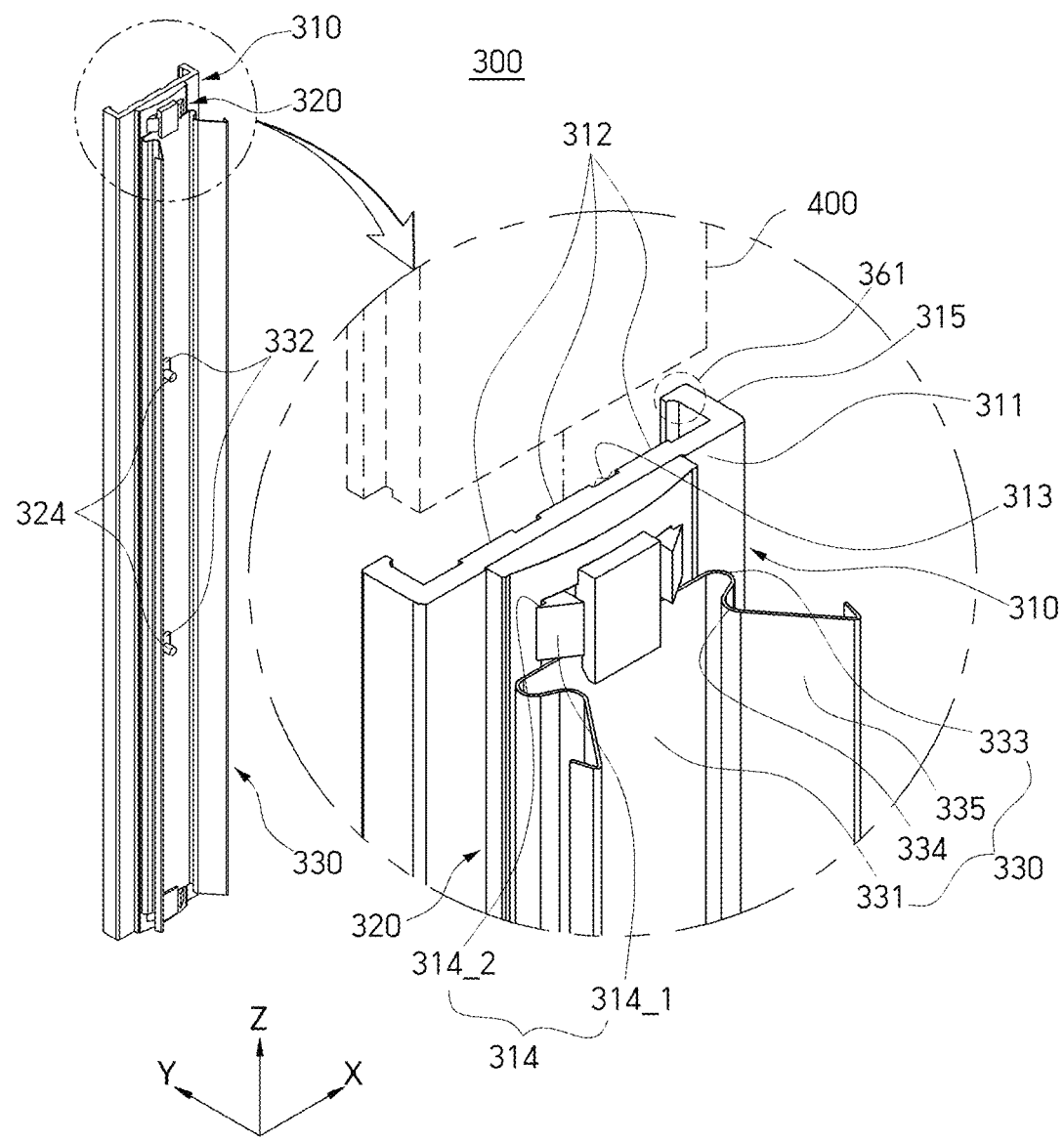
FIG. 4 is a perspective view illustrating a battery contact member according to one embodiment of the present invention.
Figure 5:
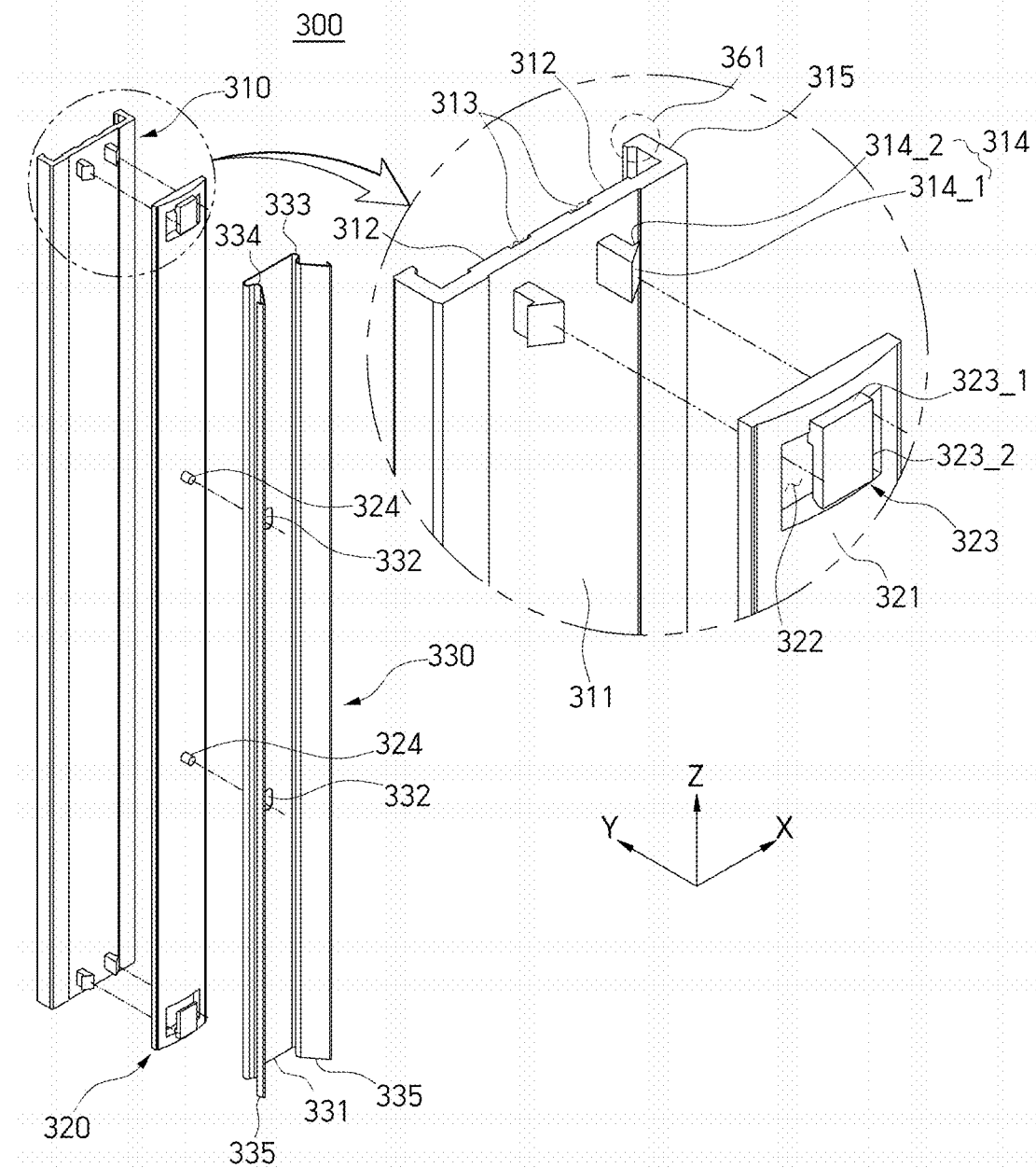
FIG. 5 is an exploded perspective view illustrating a state in which the battery contact member according to one embodiment of the present invention is exploded.
Figure 6:
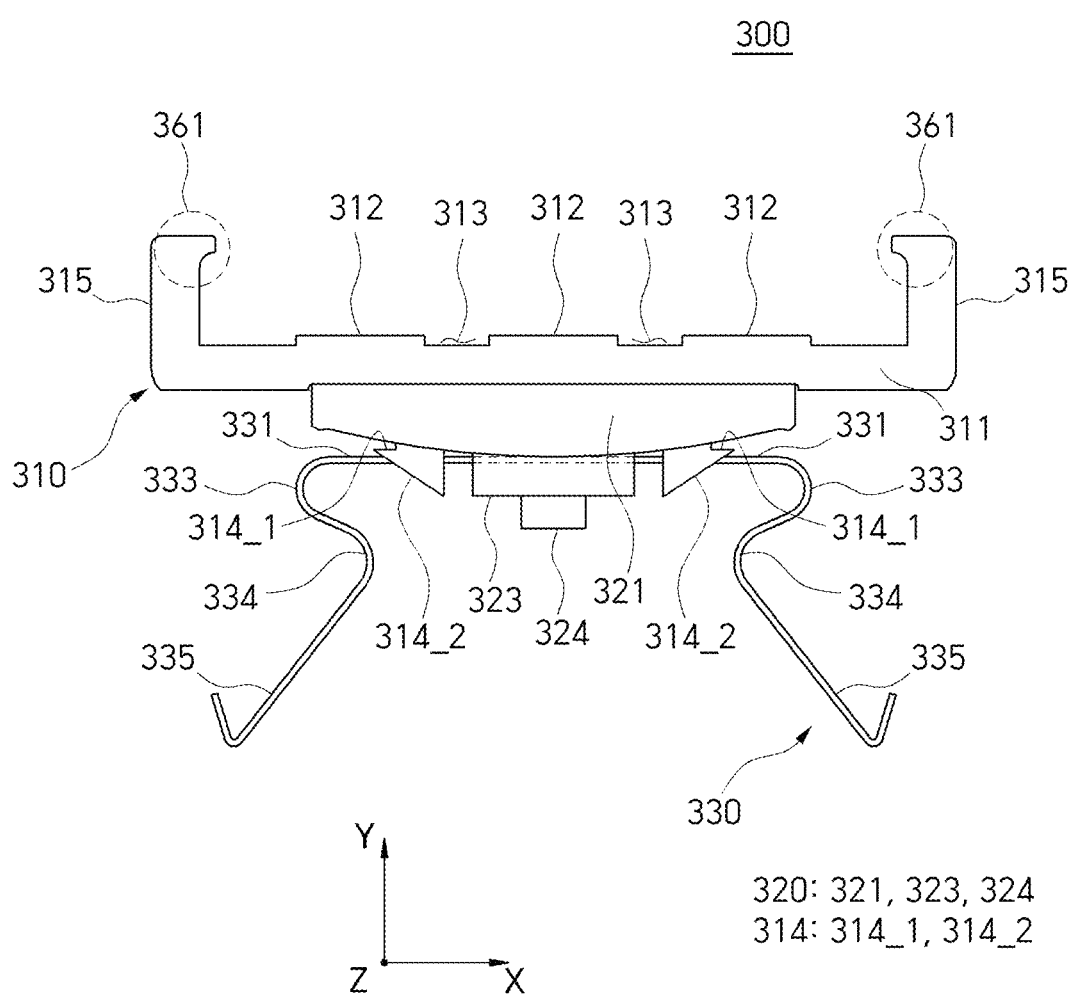
FIG. 6 is a plan view illustrating the battery contact member according to one embodiment of the present invention when viewed from above.

FIG. 4 is a perspective view illustrating the battery contact member according to one embodiment of the present invention, FIG. 5 is an exploded perspective view illustrating a state in which the battery contact member according to one embodiment of the present invention is exploded, and FIG. 6 is a plan view illustrating the battery contact member according to one embodiment of the present invention when viewed from above.

Referring to FIGS. 4 to 6, the battery contact member 300 according to one embodiment of the present invention includes the insulating member 310, a coupling member 320, and an elastic member 330.

The insulating member 310 is inserted into the battery housing 100 in a vertical direction, and the cooling block 400 is coupled to one surface thereof.

The cooling block 400 may be coupled to the insulating member 310 in a fitting manner.

In addition, the insulating member 310 is formed of a material such as plastic.

Accordingly, the insulating member 310 may effectively improve the insulation performance between the high voltage battery 200 and the battery housing 100.

Meanwhile, the insulating member 310 may be formed of one of various materials as long as the high voltage battery 200 is insulated from the battery housing 100.

The insulating member 310 includes a first base portion 311, ribs 312, slots 313, coupling protrusions 314, and extending portions 315.

The first base portion 311 may be a portion formed of a plate material having a rectangular shape and form a body of the insulating member 310.

The plurality of ribs 312 are disposed on one surface, which is disposed in a direction in which the cooling block 400 is disposed, of the first base portion 311 to be spaced apart from each other by a distance in a width direction which is an X-direction illustrated in FIGS. 5 and 6.

In addition, the rib 312 extends in a longitudinal direction of the first base portion 311 formed of the plate material having the rectangular shape.

Accordingly, due to the rib 312, the cooling block 400 inserted into the insulating member 310 is spaced apart from the first base portion 311 by a distance.

The slot 313 is formed between the plurality of ribs 312.

The slot 313 is a slot formed between the plurality of ribs 312, and an air layer is formed therein.

The slot 313 forms the air layer between the plurality of ribs 312 to block electrical connection of the high voltage battery 200 and insulate heat that is generated by the high voltage battery 200 and passes through the cooling block 400.

In addition, the slot 313 may supplement an assembly tolerance generated during a process of designing the battery contact member 300.

The coupling protrusions 314 are formed on both end portions, which are disposed in a longitudinal direction which is the Z-direction illustrated in FIGS. 4 and 5, of the other surface of the first base portion 311.

In addition, the coupling protrusions 314 are formed in a pair on the first base portion 311 to be spaced a distance from each other in the width direction which is the X-direction shown in FIG. 5.

The coupling protrusions 314 may couple the coupling member 320 to the first base portion 311 of the insulating member 310.

The coupling protrusion 314 and the coupling member 320 are coupled in a hook-coupling manner.

Specifically, the coupling protrusion 314 includes an inclined surface 314_1 and a step portion 314_2.

The inclined surface 314_1 is a surface, which is formed in a direction in which the coupling member 320 is disposed, of the coupling protrusion 314 and is inclined outward.

When the coupling member 320 is coupled to the first base portion 311, due to such an inclined surface 314_1, the coupling member 320 may be easily fitted to the coupling protrusion 314 along the inclined surface 314_1 in a fitting manner.

The step portion 314_2 has a surface connecting the inclined surface 314_1 and the coupling protrusion 314 and is in contact with the other surface of the coupling member 320, which is coupled to the first base portion 311, through the inclined surface 314_1.

Accordingly, the step portion 314_2 in contact with the other surface of the coupling member 320 prevents the coupling member 320 coupled to the first base portion 311 from being separated from the first base portion 311.

Accordingly, the coupling member 320 may be firmly coupled to the insulating member 310 in a hook-coupling manner.

The insulating member 310 may be easily coupled to the coupling member 320, and separation of the coupling member 320 from the insulating member 310 due to vibration generated when a vehicle travels may be effectively prevented.

The extending portions 315 extend from both end portions of the first base portion 311 in the direction in which the cooling block 400 is disposed.

In addition, the cooling block 400 is coupled between the extending portions 315 formed in a pair in a fitting manner.

Accordingly, the extending portions 315 formed in the pair are spaced apart from each other by a distance which is the same as a width of the cooling block 400.

That is, a first width of the first base portion 311 excluding thicknesses of extending portions 315 formed in the pair is the same as the width of the cooling block 400.

Accordingly, inner side surfaces of the extending portions 315 formed in the pair are in contact with both side surfaces of the cooling block 400.

Guide protrusions 361 are formed on the extending portions 315.

The guide protrusions 361 allow the cooling block 400 to be easily inserted between the pair of extending portions 315.

Particularly, the guide protrusions 361 allow the other surface of the cooling block 400 inserted between the pair of extending portions 315 to be in firm contact with one surface of the first base portion 311.

In addition, the guide protrusions 361 effectively prevent the cooling block 400 inserted between the pair of extending portions 315 from being separated from the first base portion 311.

The coupling member 320 is a member coupled to the other surface of the insulating member 310 in a hook-coupling manner and allows the elastic member 330 to be coupled to the coupling member 320.

The coupling member 320 includes a second base portion 321, coupling grooves 322, support portions 323, and fixing pins 324.

The second base portion 321 may be formed of a plate material having a rectangular shape and form a body of the coupling member 320.

In addition, one surface of the second base portion 321 is in contact with the other surface of the first base portion 311, and the other surface of the second base portion 321 is in contact with one surface of the elastic member 330.

In addition, a cross section of the second base portion 321 is formed as a curved surface.

The coupling groove 322 is a groove formed in the second base portion 321 at a position corresponding to the coupling protrusion 314.

In addition, the coupling protrusion 314 is inserted into the coupling groove 322.

Specifically, the step portion 314_2 of the coupling protrusion 314 is coupled to the coupling groove 322 in a hook-coupling manner by being hooked thereto.

Accordingly, the coupling member 320 may be firmly coupled to the insulating member 310.

The pair of support portions 323 are provided on both end portions, which are disposed in the Z-direction illustrated in FIGS. 4 and 5, of the other surface of the second base portion 321

The support portion 323 allows the elastic member 330 to be coupled to the second base portion 321.

The support portion 323 includes a boss member 323_1 and fixing panels 323_2.

The boss member 323_1 protrudes from the other surface of the second base portion 321.

In addition, the boss member 323_1 is disposed between the coupling groove 322 and an end portion of the second base portion 321.

When the elastic member 330 is inserted into the support portion 323, since the boss member 323_1 is in contact with both end portions, which are disposed in the Z-direction illustrated in FIGS. 4 and 5, of the elastic member 330, the elastic member 330 may be prevented from moving from the support portion 323 in the Z-direction illustrated in FIGS. 4 and 5.

The fixing panel 323_2 is coupled to the other surface of the boss member 323_1.

In addition, the fixing panels 323_2 extend in facing directions from both end portions of the second base portion 321 in the longitudinal direction.

Particularly, as the fixing panel 323_2 is coupled to the other surface of the boss member 323_1, the fixing panel 323_2 is spaced apart from the other surface of the second base portion 321 by a distance.

That is, a gap is formed between the fixing panel 323_2 and the second base portion 321, and the elastic member 330 is coupled to the support portion 323 through the gap.

When the elastic member 330 is coupled to the support portion 323, as the other surface of the elastic member 330 is coupled to the fixing panel 323_2, the elastic member 330 may be prevented from moving in a Y-direction illustrated in FIGS. 4 and 5.

The fixing pin 324 is disposed between the pair of support portions 323 on the other surface of the second base portion 321.

In addition, the fixing pin 324 passes through the elastic member 330 coupled to the support portion 323 to restrict the elastic member 330 from moving in the width direction which is the X-direction illustrated in FIG. 6.

The elastic member 330 is coupled to the coupling member 320 and elastically presses the insulating member 310 coupled to the cooling block 400 in a direction toward the high voltage battery 200.

The elastic member 330 is inserted between the second base portion 321 and the fixing panel 323_2 of the support portion 323.

Specifically, one surface of the elastic member 330 is coupled to the other surface of the insulating member 310 with the coupling member 320 serving as a medium.

In addition, the other end of the elastic member 330 is in contact with an inner side surface of the battery housing 100 to elastically press the insulating member 310 in the direction toward the high voltage battery 200.

The elastic member 330 includes a contact portion 331, first curved surface portions 333, second curved surface portions 334, and leg portions 335.

The contact portion 331 is a portion forming a body of the elastic member 330, and one surface thereof is in contact with the other surface of the second base portion 321.

In addition, both end portions, which are disposed in the Z-direction illustrated in FIGS. 4 and 5, of the contact portion 331 are inserted into the support portion 323.

That is, the contact portion 331 may be firmly fixed to the coupling member 320 due to the fixing panel 323_2 of the support portion 323.

The contact portion 331 is in contact with the other surface of the second base portion 321.

Specifically, the contact portion 331 is in uniform contact with the second base portion 321 of which the cross section is formed as the curved surface.

Particularly, as described above, when the elastic member 330 elastically presses the insulating member 310 in the direction toward the high voltage battery 200, the contact portion 331 is bent to correspond to the other surface of the second base portion 321 of which the cross section is formed as the curved surface.

Accordingly, the contact portion 331 may stably and more firmly support the second base portion 321.

Fixing grooves 332 are formed in the contact portion 331.

The fixing groove 332 is formed at a position corresponding to the fixing pin 324 formed on the second base portion 321.

In addition, when the elastic member 330 is coupled to the coupling member 320, the fixing pin 324 passes through the fixing groove 332.

While the fixing groove 332 is coupled to the fixing pin 324, the fixing groove 332 guides a coupling position of the elastic member 330 and prevents the elastic member 330 coupled to the coupling member 320 from moving in the X-direction illustrated in FIG. 6.

Meanwhile, the fixing pins 324 and the fixing grooves 332 are each provided in a pair and are disposed on the second base portion 321 and in the contact portion 331 to be spaced apart from each other in the longitudinal direction which is the Z-direction illustrated in FIGS. 4 and 5.

Accordingly, since the fixing pins 324 and the fixing grooves 332 are each provided as at least two fixing pins 324 and at least two fixing grooves 332, rotation, which occurs in a case in which one fixing pin 324 and one fixing groove 332 are formed, of the elastic member 330 about the fixing pin 324 may be effectively prevented.

The first curved surface portions 333 are formed on both ends of the contact portion 331 in the width direction which is the X-direction illustrated in FIG. 6.

The second curved surface portions 334 extend from the first curved surface portions 333 and form curved lines extending in inward directions from both ends thereof disposed in the width direction which is the X-direction illustrated in FIG. 6.

The leg portions 335 obliquely extend outward from the second curved surface portions 334.

In addition, end portions of the leg portions 335 are in contact with an inner side surface of the battery housing 100.

Accordingly, in the elastic member 330, the leg portions 335 support the inner side surface of the battery housing 100 and elastically press the coupling member 320 coupled to the contact portion 331 using an elastic force which is applied to move the leg portions 335 in facing directions.

In addition, since the insulating member 310 coupled to the coupling member 320 is pressed, the cooling block 400 coupled to the insulating member 310 may elastically press the high voltage battery 200.

Meanwhile, a rib according to another embodiment of the present invention may be formed on a second base portion of a coupling member.

Hereinafter, a battery contact member according to another embodiment of the present invention in which the rib is formed on the second base portion of the coupling member will be described in detail with reference to the accompanying drawings.

Figure 7:
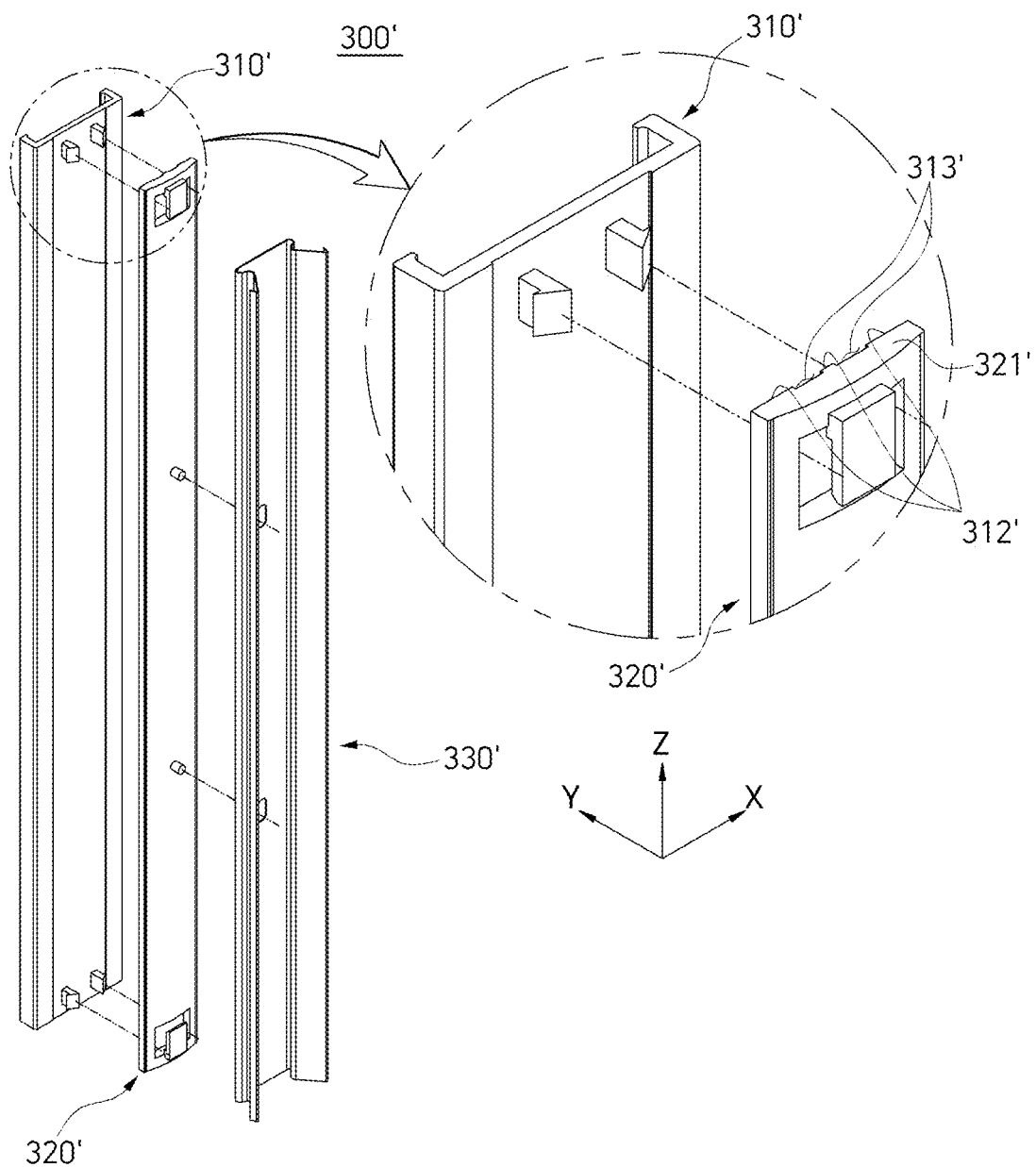
FIG. 7 is an exploded perspective view illustrating a state in which a battery contact member according to another embodiment of the present invention is exploded.
Figure 8:
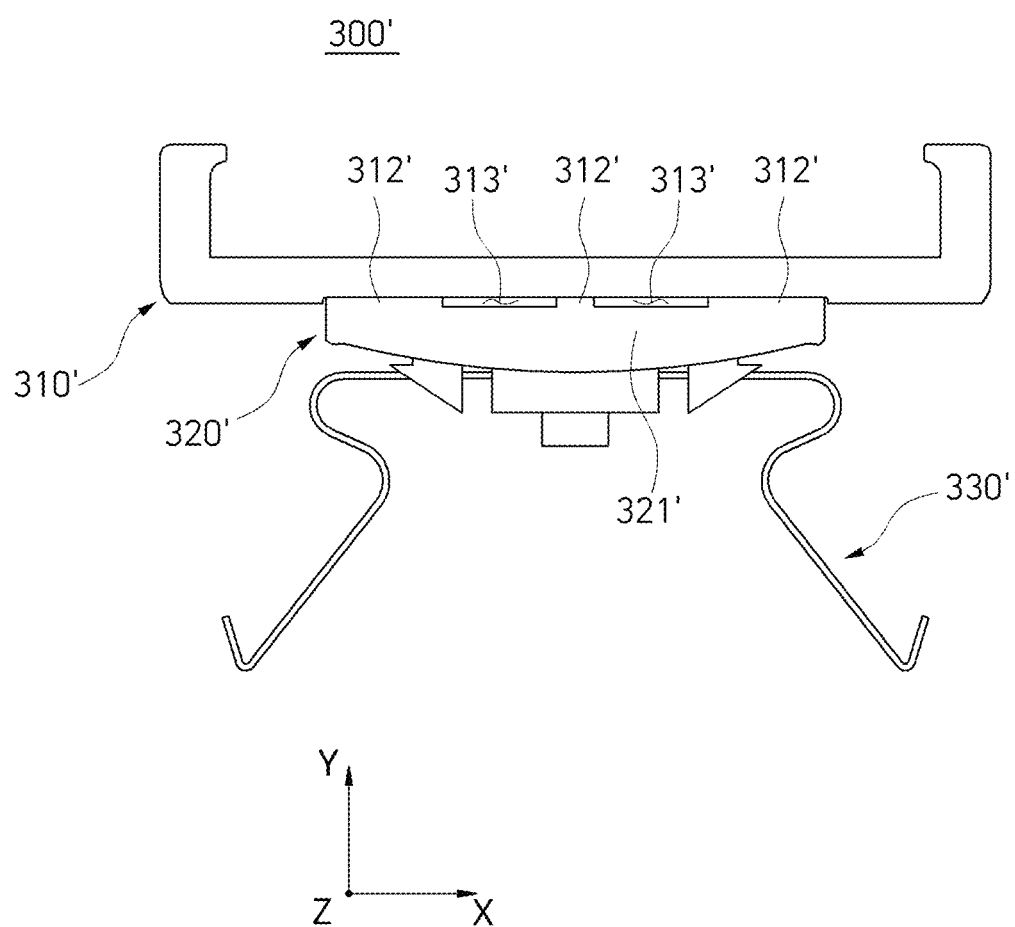
FIG. 8 is a plan view illustrating the battery contact member according to another embodiment of the present invention when viewed from above.

FIG. 7 is an exploded perspective view illustrating a state in which the battery contact member according to another embodiment of the present invention is exploded, and FIG. 8 is a plan view illustrating the battery contact member according to another embodiment of the present invention when viewed from above.

Specific descriptions of components which are the same as those of the above-described embodiment will be omitted.

Referring to FIGS. 7 and 8, a battery contact member 300' according to one embodiment of the present invention includes an insulating member 310', a coupling member 320', and an elastic member 330'.

The insulating member 310' is vertically inserted into a battery housing, and a cooling block is coupled to one surface thereof.

The cooling block may be coupled to the insulating member 310' in a fitting manner.

In addition, the insulating member 310' may be formed of a material such as plastic.

Accordingly, the insulating member 310' may effectively improve the insulation performance between a high voltage battery and the battery housing.

The coupling member 320' is a member coupled to the other surface of the insulating member 310' in a hook-coupling manner so that the elastic member 330' may be coupled to the coupling member 320'.

The coupling member 320' includes a second base portion 321' and ribs 312'.

The second base portion 321' may be formed of a plate material having a rectangular shape and may form a body of the coupling member 320'.

In addition, one surface of the second base portion 321' is in contact with the other surface of the insulating member 310', and the other surface thereof is in contact with one surface of the elastic member 330'.

In addition, a cross section of the second base portion 321' is formed as a curved surface.

The plurality of ribs 312' are disposed on one surface, which is disposed in a direction in which the insulating member 310' is disposed, of the second base portion 321' to be spaced apart from each other by a distance in a width direction which is an X-direction illustrated in FIGS. 7 and 8.

In addition, the rib 312' extends in a longitudinal direction of the second base portion 321' formed of the plate material having the rectangular shape.

Accordingly, due to the rib 312', the second base portion 321' and the insulating member 310' are spaced apart from each other by a distance.

Slots 313' are formed between the plurality of ribs 312'.

The slot 313' is a slot between the plurality of ribs 312', and an air layer is formed therein.

The slot 313' forms the air layer between the plurality of ribs 312' to block electrical connection of the high voltage battery and insulates heat which is generated by the high voltage battery and passes through the cooling block.

Meanwhile, ribs according to still another embodiment of the present invention may be formed on a first base portion of an insulating member and a second base portion of a coupling member.

Hereinafter, a battery contact member according to still another embodiment of the present invention in which the ribs are formed on the first base portion of the insulating member and the second base portion of the coupling member will be described in detail with reference to the accompanying drawings.

Figure 9:
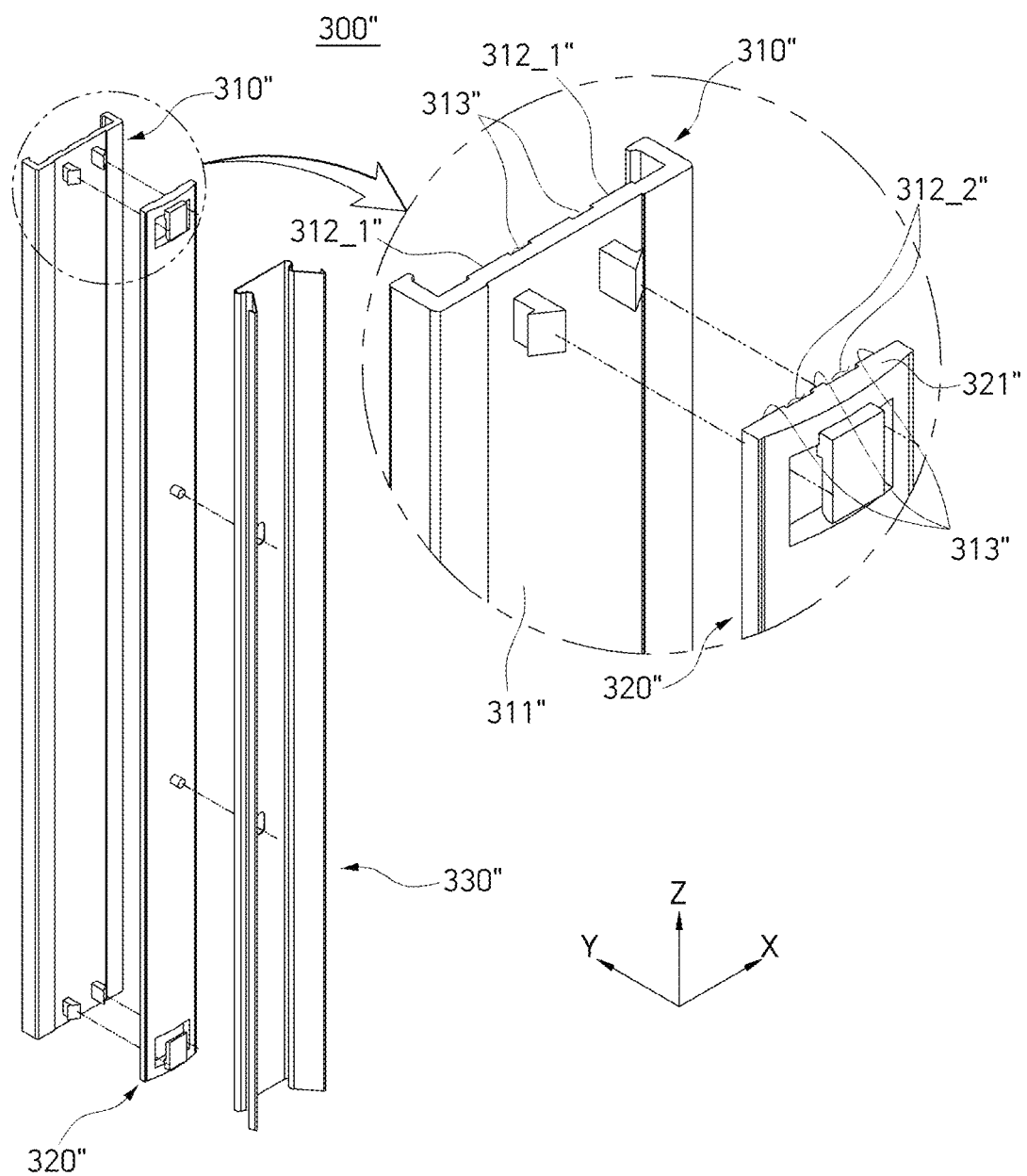
FIG. 9 is an exploded perspective view illustrating a state in which a battery contact member according to still another embodiment of the present invention is exploded.
Figure 10:
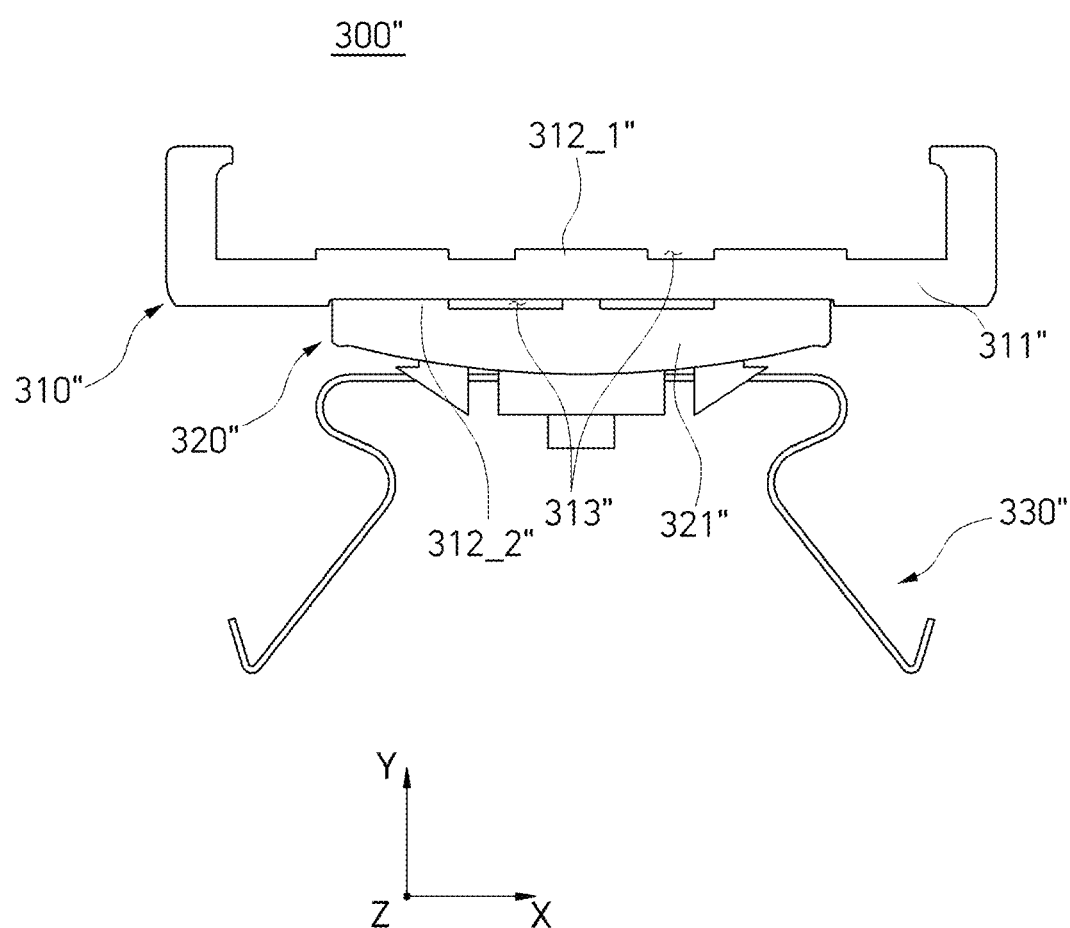
FIG. 10 is a plan view illustrating the battery contact member according to still another embodiment of the present invention when viewed from above.

FIG. 9 is an exploded perspective view illustrating a state in which the battery contact member according to still another embodiment of the present invention is exploded, and FIG. 10 is a plan view illustrating the battery contact member according to still another embodiment of the present invention when viewed from above.

Specific descriptions of components which are the same as those of the above-described embodiments will be omitted.

Referring to FIGS. 9 and 10, a battery contact member 300" according to one embodiment of the present invention includes an insulating member 310", a coupling member 320", and an elastic member 330".

The insulating member 310" is vertically inserted into a battery housing, and a cooling block is coupled to one surface thereof.

The cooling block may be coupled to the insulating member 310" in a fitting manner.

In addition, the insulating member 310" is formed of a material such as plastic.

Accordingly, the insulating member 310" may effectively improve the insulation performance between a high voltage battery and the battery housing.

The insulating member 310" includes a first base portion 311" and first ribs 312_1".

The first base portion 311" may be a portion formed of a plate material having a rectangular shape and form a body of the insulating member 310".

The plurality of first ribs 312_1" are disposed on one surface, which is disposed in a direction in which the cooling block is disposed, of the first base portion 311" to be spaced apart from each other by a distance in a width direction which is an X-direction illustrated in FIGS. 9 and 10.

In addition, the first rib 312_1" extends in a longitudinal direction of the first base portion 311" formed of the plate material and the rectangular shape.

Accordingly, due to the first rib 312_1", the cooling block inserted into the insulating member 310" is spaced apart from the first base portion 311" by a distance.

Slots 313" are formed between the plurality of first ribs 312_1".

The slot 313" is a slot formed between the plurality of first ribs 312_1", and an air layer is formed therein.

Due to the slot 313", the air layer is formed between the plurality of first ribs 312_1" to block electrical connection of the high voltage battery and insulate heat which is generated by the high voltage battery and passes through the cooling block.

The coupling member 320" is a member coupled to the other surface of the insulating member 310" in a hook-coupling manner and allows the elastic member 330" to be coupled to the coupling member 320".

The coupling member 320" includes a second base portion 321" and second ribs 312_2".

The second base portion 321" may be formed of a plate material having a rectangular shape and may form a body of the coupling member 320".

In addition, one surface of the second base portion 321" is in contact with the other surface of the insulating member 310", and the other surface thereof is in contact with one surface of the elastic member 330".

In addition, a cross section of the second base portion 321" is formed as a curved surface.

The plurality of second ribs 312_2" are formed on one surface, which is disposed in a direction in which the insulating member 310" is disposed, of the second base portion 321" to be spaced apart from each other by a distance in the width direction which is the X-direction illustrated in FIGS. 9 and 10.

In addition, the second rib 312_2" extends in a longitudinal direction of the second base portion 321" formed of the plate material having the rectangular shape.

Accordingly, due to the second rib 312_2", the second base portion 321" is spaced apart from the insulating member 310" by a distance.

Slots 313" are formed between the plurality of second ribs 312_2".

The slot 313" is a slot formed between the plurality of second ribs 312_2", and an air layer is formed therein.

Accordingly, in the still another embodiment of the present invention in which the first ribs 312_1" and the second ribs 312_2" are respectively formed on the first base portion 311" and the second base portion 321", since the slots 313 are formed between the plurality of first ribs 312_1" and the second ribs 312_2", the air layers are formed between the plurality of first ribs 312_1" and the second ribs 312_2", electrical connection of the high voltage battery may be more effectively blocked, and heat which is generated by the high voltage battery and passes through the cooling block may be effectively insulated.

According to the present invention, since an insulating member is formed of a material such as plastic, there is an effect of effectively improving the insulation performance between a high voltage battery and a battery housing.

In addition, since a coupling member and the insulating member are coupled in a hook-coupling manner, there are effects in that the insulating member and the coupling member can be easily coupled, and the coupling member can be effectively prevented from being separated from the insulating member even with frequent vibration occurring when a vehicle travels.

In addition, since an end portion, which is disposed in a longitudinal direction, of an elastic member is in contact with a boss member of a support portion, the elastic member is prevented from moving in a Z-direction illustrated in the accompanying drawing, since a fixing pin of a second base portion is inserted into a fixing groove of a contact portion, the elastic member is prevented from moving in an X-direction illustrated in the accompanying drawing, and since the contact portion of the elastic member is in contact with a fixing panel of the support portion, the elastic member is prevented from moving in a Y-direction so that there is an effect of effectively preventing the elastic member from being disassembled from an assembly with the coupling member.

The present invention is not limited to the above-described embodiments and may be variously modified and implemented within a range allowed by the technical spirit of the present invention.

What is claimed is:

1. A high voltage battery assembly comprising:
 a high voltage battery;
 a battery housing in which the high voltage battery is accommodated;
 a plurality of battery contact members disposed between the high voltage battery and the battery housing; and
 a plurality of cooling blocks which are each inserted into one of the plurality of battery contact members to be in contact with the high voltage battery and cool the high voltage battery, wherein each battery contact member comprises:
an insulating member which is vertically inserted into the battery housing and of which one surface is coupled to the cooling block in a fitting manner;
a coupling member pressed against the other surface of the insulating member; and
a plurality of elastic members of which one surfaces are coupled to the other surface of the insulating member with the coupling member serving as a medium, and the other ends are in contact with an inner side surface of the battery housing to elastically press the insulating member,
the insulating member includes:
a first base portion provided a body of the insulating member;
extending portions extending from both end portions of the first base portion in a direction in which the cooling block is disposed; and
a pair of coupling protrusions disposed on both end portions, which are disposed in a longitudinal direction, of the other surface of the first base portion to be coupled to the coupling member, and
the coupling member includes:
a second base portion of which one surface is in contact with the other surface of the first base portion;
a pair of support portions disposed on both end portions, which are disposed in the longitudinal direction, of the other surface of the second base portion to support the elastic member; and
a fixing pin disposed between the pair of the support portions on the second base portion to restrict movement of the elastic member.

2. The high voltage battery assembly of claim 1, wherein the plurality of battery contact members are disposed to be spaced apart from each other by a distance along a circumference of the high voltage battery.

3. A battery contact member, which is accommodated in a battery housing and accommodates a cooling block configured to cool heat generated by a high voltage battery, the battery contact member comprising:
an insulating member which is vertically inserted into the battery housing and of which one surface is coupled to the cooling block in a fitting manner;
a coupling member pressed against the other surface of the insulating member; and
a plurality of elastic members of which one surfaces are coupled to the other surface of the insulating member with the coupling member serving as a medium, and the other ends are in contact with an inner side surface of the battery housing to elastically press the insulating member,
wherein the insulating member includes:
a first base portion provided a body of the insulating member;
extending portions extending from both end portions of the first base portion in a direction in which the cooling block is disposed; and
a pair of coupling protrusions disposed on both end portions, which are disposed in a longitudinal direction, of the other surface of the first base portion to be coupled to the coupling member, and
the coupling member includes:
a second base portion of which one surface is in contact with the other surface of the first base portion;
a pair of support portions disposed on both end portions, which are disposed in the longitudinal direction, of the other surface of the second base portion to support the elastic member; and
a fixing pin disposed between the pair of the support portions on the second base portion to restrict movement of the elastic member.

4. The battery contact member of claim 3, wherein the extending portions formed in a pair are spaced apart from each other by a width of the cooling block.

5. The battery contact member of claim 3, wherein the insulating member further includes a plurality of ribs which are spaced apart from each other by a distance on one surface of the first base portion in a width direction and extend in the longitudinal direction,
wherein a slot filled with air to insulate heat generated by the high voltage battery is formed between the plurality of the ribs.

6. The battery contact member of claim 3, wherein the coupling protrusion is coupled to the coupling member in a hook-coupling manner.

7. The battery contact member of claim 3, wherein the extending portion includes a guide protrusion in contact with one surface of the cooling block to prevent the cooling block from being separated from the first base portion.

8. The battery contact member of claim 3, wherein the coupling member further includes a coupling groove which is disposed in the second base portion at a position corresponding to the coupling protrusion, and into which the coupling protrusion is inserted,
wherein the coupling protrusion is coupled to the coupling groove in a hook-coupling manner.

9. The battery contact member of claim 3, wherein a cross section of the other surface of the second base portion includes a curved surface.

10. The battery contact member of claim 3, wherein the support portions include boss members protruding from the other surface of the second base portion; and
fixing panels coupled to the boss members and extending from both end portions, which are disposed in the longitudinal direction, of the second base portion in facing directions,
wherein the fixing panel is spaced apart from the second base portion by a distance.

11. The battery contact member of claim 10, wherein the elastic member is inserted between the second base portion and the fixing panel.

12. The battery contact member of claim 3, wherein the elastic member includes:
a contact portion of which one surface is in contact with the other surface of the second base portion and which is inserted between the support portions;
first curved surface portions disposed on both ends, which are disposed in a width direction, of the contact portion and having curved lines extending in an outward direction;
second curved surface portions extending from the first curved surface portions and having curved lines extending in an inward direction; and
leg portions obliquely extending outward from the second curved surface portions.

13. A battery contact member, which is accommodated in a battery housing and accommodates a cooling block configured to cool heat generated by a high voltage battery, the battery contact member comprising:
an insulating member which is vertically inserted into the battery housing and of which one surface is coupled to the cooling block in a fitting manner;

a coupling member pressed against the other surface of the insulating member; and a plurality of elastic members of which one surfaces are coupled to the other surface of the insulating member with the coupling member serving as a medium, and the other ends are in contact with an inner side surface of the battery housing to elastically press the insulating member, wherein the coupling member includes a first base portion, and wherein the insulating member includes a second base portion disposed on the first base portion and having a plurality of ribs which extend in a longitudinal direction and are spaced apart from each other by a distance on one surface of the second base portion facing the first base portion.

14. The battery contact member of claim 13, wherein the plurality of ribs are in contact with the first base portion.

15. The battery contact member of claim 13, wherein the second base portion has slots between the plurality of ribs.

16. The battery contact member of 13, wherein the first base portion also includes a plurality of ribs which are spaced apart from each other and extend in the longitudinal direction.

17. The battery contact member of 16, wherein the first base portion includes slots between the plurality of ribs of the first base portion.

\* \* \* \* \*